United States Patent
Power et al.

(10) Patent No.: US 12,356,528 B2
(45) Date of Patent: Jul. 8, 2025

(54) INTERFACE ADAPTER

(71) Applicant: Itron, Inc., Liberty Lake, WA (US)

(72) Inventors: John Martin Power, Dublin (IE); Francis Joseph Magee, Trim (IE); William John Kerrigan, Navan (IE)

(73) Assignee: Itron, Inc., Liberty Lake, WA (US)

( * ) Notice: Subject to any disclaimer, the term of this patent is extended or adjusted under 35 U.S.C. 154(b) by 101 days.

(21) Appl. No.: 18/521,985

(22) Filed: Nov. 28, 2023

(65) Prior Publication Data

US 2025/0176087 A1 May 29, 2025

(51) Int. Cl.
*H05B 47/18* (2020.01)
*G06F 13/40* (2006.01)

(52) U.S. Cl.
CPC ....... *H05B 47/183* (2024.01); *G06F 13/4063* (2013.01)

(58) Field of Classification Search
CPC ..... H04M 7/00; G06F 13/4063; H05B 47/183
See application file for complete search history.

(56) References Cited

U.S. PATENT DOCUMENTS

| | | | | |
|---|---|---|---|---|
| 7,290,192 B2* | 10/2007 | Ichiyoshi | ......... | G01R 31/31907 714/736 |
| 9,979,625 B2* | 5/2018 | McLaughlin | ......... | H04L 63/126 |
| 2013/0264971 A1* | 10/2013 | Yeh | ......... | H05B 47/18 315/312 |
| 2014/0139140 A1* | 5/2014 | Yeh | ......... | H05B 47/18 315/297 |
| 2015/0130365 A1* | 5/2015 | Kim | ......... | H05B 47/11 315/294 |
| 2016/0323979 A1* | 11/2016 | Hu | ......... | H05B 47/185 |
| 2019/0342976 A1 | 11/2019 | Patel | | |
| 2020/0068685 A1* | 2/2020 | DiFelice | ......... | H05B 47/175 |
| 2020/0183867 A1* | 6/2020 | Ender | ......... | H05B 47/1965 |
| 2022/0346210 A1 | 10/2022 | Böhnel | | |
| 2022/0360629 A1* | 11/2022 | Dziekonski | ......... | H04L 67/12 |

OTHER PUBLICATIONS

Casambi: "CBU-DCS profile—DALI Gateway", Jun. 3, 2020, pp. 1-17.
HMS: "BACnet IP Server—Digitally Addressable Lighting Interface (DALI-2)", Jan. 1, 2022, pp. 1-183.
Search Report and Written Opinion for International Application No. PCT/US24/49156, Dated Dec. 23, 2024, 15 pages.

* cited by examiner

*Primary Examiner* — Phong H Dang
(74) *Attorney, Agent, or Firm* — Lee & Hayes, P.C.

(57) ABSTRACT

An interface adapter includes a first interface for coupling to a native interface of a first device, a second interface for coupling to a standardized interface of a second device, which is different from the native interface, an adapter memory, and one or more processors coupled to the first interface, the second interface, and the adapter memory. The one or more processors store, at a specific memory location of the adapter memory, a configuration table associated with the first device indicative of: capabilities of, and data variables supported by, the first device, locations of the data variables within a device memory of the first device, sizes of the data variables, and types of the data variables. The one or more processors provide the second device, via the second interface, access to one or more data variables of the data variables based on the configuration table.

20 Claims, 4 Drawing Sheets

INTERFACE ADAPTER

TECHNICAL FIELD

The present disclosure generally relates to the field of communication over an interface, and more specifically to a method and apparatus to communicate, over a first interface, information associated with a device connected via a second interface.

BACKGROUND

A digital addressable lighting interface (DALI) is used to connect a Networked Lighting Controller (NLC) to LED Driver(s) to control and monitor the luminaire and to access Asset Data. The DALI Standard has evolved to support various lighting-related sensors, such as push-buttons, occupancy sensors, and light sensors. However, there is currently no sensor support for a general sensor, for example, for a commercially available off-the-shelf (COTS) sensor that uses non-DALI, such as wired (e.g., RS485, RS232, etc.) and/or wireless (e.g., WiFi, Zigbee, Bluetooth, etc.), communications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
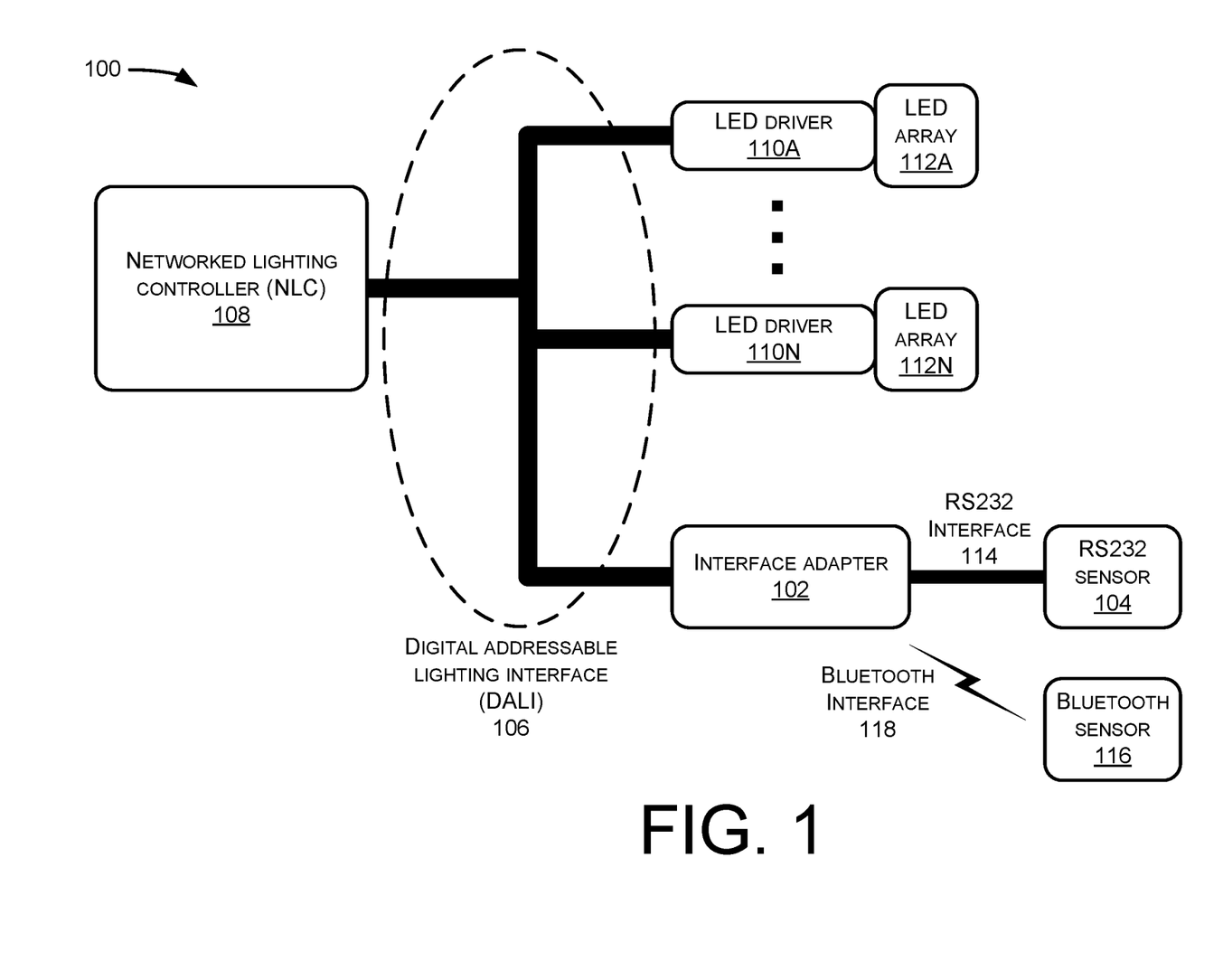
FIG. 1 illustrates an example configuration with an interface adapter facilitating a commercially available off-the-shelf (COTS) sensor to work with a digital addressable lighting interface (DALI).

FIG. 1 illustrates an example configuration 100 with an interface adapter 102 facilitating a commercially available off-the-shelf (COTS) sensor, such as an RS232 sensor 104, to work with a digital addressable lighting interface (DALI) 106. The RS232 sensor 104 or other COTS sensor may include non-lighting related sensors, such as traffic, pollution, or weather related sensors. In this example, a networked lighting controller (NLC) 108 is coupled to a plurality of DALI compatible devices, such as LED drivers 110A-110N and LED arrays 112A-112N (two pairs, 110A and 112A pair and 110N and 112N pair, are shown), via the DALI 106 to control lighting of the LED arrays 112. The NLC 108 is also coupled to the interface adapter 102 via the DALI 106 to read/write data from and to the RS232 sensor, which is coupled to the interface adapter 102 via an RS232 interface 114 (shown as a wired connection), a native interface of the RS232 sensor 104. While the RS232 sensor 104 is shown as an example of COTS sensors, other COTS devices may be coupled to the NLC through the DALI 106 via the interface adaptor, using a wired or wireless interface, or connection, to communicate with the NLC, for example, a Bluetooth sensor 116 using Bluetooth interface 118 (wireless). Other interfaces may include an RS232 interface, an RS485 interface, a WiFi interface, a Zigbee interface, a near-field communication (NFC) interface, and the like.

Figure 2:
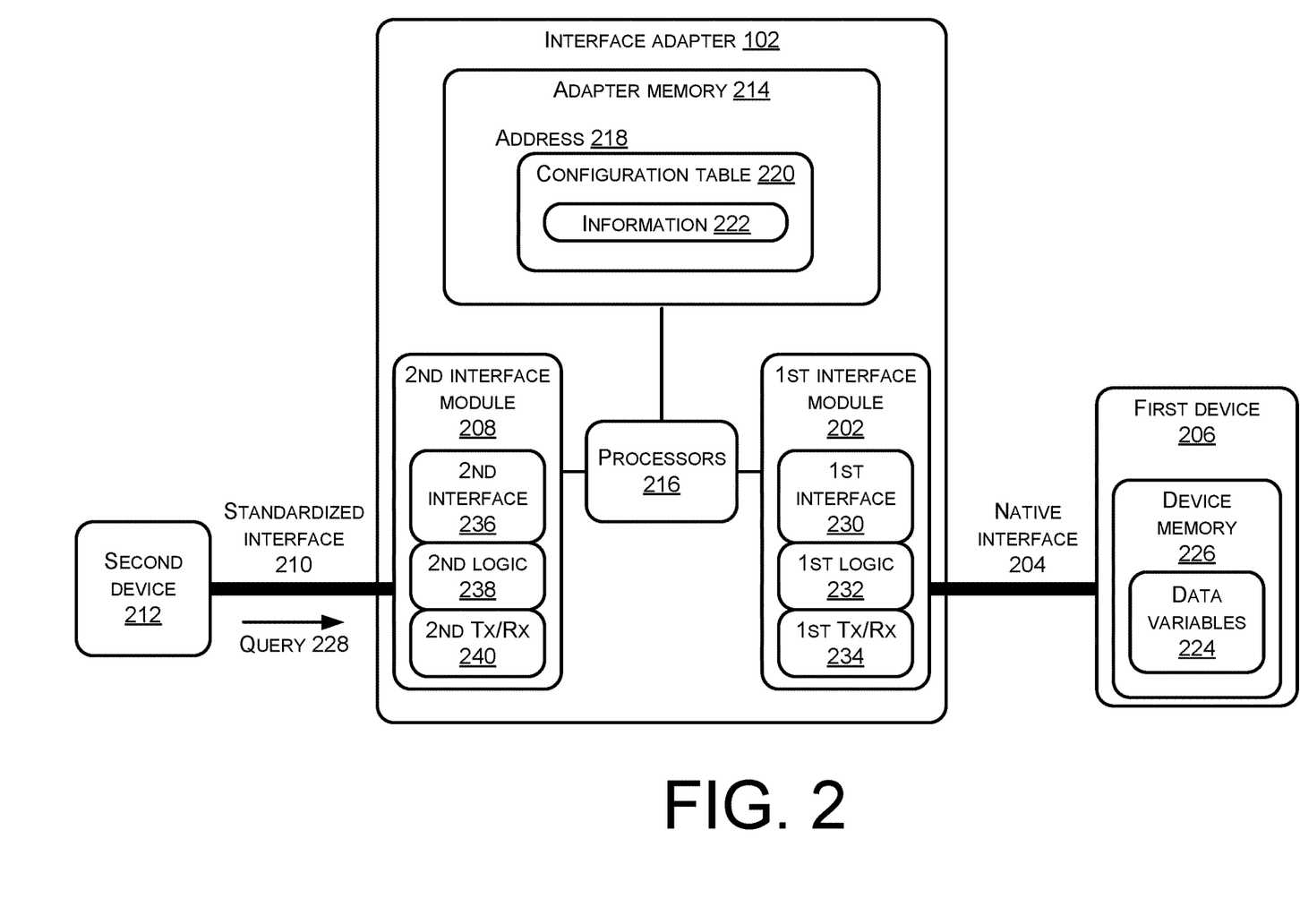
FIG. 2 illustrates a block diagram of an example interface adapter.

FIG. 2 illustrates a block diagram of an interface adapter 102. The interface adapter 102 may comprise a first interface module 202 configured to couple to a native interface 204 of a first device 206, such as the RS232 interface 114 of the RS232 sensor 104, and a second interface module 208 configured to couple to a standardized interface 210 of a second device 212, such as the DALI 106 of the NLC 108, as shown in FIG. 1. The interface adapter 102 may additionally comprise an adapter memory 214 and one or more processors (processors) 216 coupled to the first interface module 202, the second interface module 208, and the adapter memory 214. The processors 216 may be configured to store, at a specific memory location, or address 218, of the adapter memory 214, a configuration table 220 associated with the first device 206, such as the RS232 sensor 104. The configuration table 220 may include information 222 indicative of: capabilities of the first device 206, data variables 224 supported by the first device 206, locations of the data variables 224 within a device memory 226 of the first device 206, sizes of the data variables 224, and types of the data variables 224. The processors 216 may be configured to provide the second device 212, via the second interface module 208, access to one or more data variables of the data variables 224 based on information 222 included in the configuration table 220.

The processors 216 may be further configured to provide the configuration table 220 to the second device 212 in response to receiving a query 228 from the second device 212 upon the second interface module 208 being coupled to the standardized interface 210, cause the second device 212 to register the configuration table 220, and cause the second device 212 to add the capabilities of the first device 206 to capabilities of the second device 212. For example, the NLC 108 utilizing the DALI 106, as the second device 212, may normally include lighting related capabilities, such as turning on and off or dimming an LED array 112 with an LED driver 110 as shown in FIG. 1, reading asset data, such as asset data of the LED driver 110 and the LED array 112, reading fault conditions of the LED driver 110 and the LED array 112, reading electrical metrology data associated with the NLC 108 in some cases, and supporting lighting-related sensors as push-buttons, occupancy sensors, and light sensors. By registering the configuration table 220, the NLC 108 may recognize the configuration table 220 as a DALI compatible device, and may add the capabilities of the first device 206, such as the RS232 sensor 104, to the capabilities of the NLC 108. The RS232 sensor 104 may include a smart city sensor capable of monitoring and reporting traffic, pollution, weather, and/or other parameters.

Additionally, in response to receiving the query 228 from the second device 212, i.e., the NLC 108, for each data variable, or configuration available within the first device, i.e., the RS232 sensor 104, the interface adapter 102 may make the following information available to the NLC 108: 1) a variable identifier, such as a lightweight machine to machine (LwM2M) resource link, an identifier as per ANSI C137.10, and/or proprietary reference number; 2) location of the data within a DALI device memory or the RS232 sensor 104; 3) a length of the data (in bytes); and 4) data type, for example, whether signed or unsigned integer, or string or byte list, and whether data is writeable. LwM2M is a protocol from the Open Mobile Alliance (OMA), and standard LwM2M Object 3428 may be used to represent data available in an air quality sensor, which is an example of the first device 206, for example, a resource link "3428/0/15" may represent a level of nitrogen dioxide measured by the air quality sensor. By utilizing the configuration table 220, the interface adapter 102 enables a standardized way to access the data from the first device 206, such as the RS232 sensor 104, over the standardized interface 210, such as the DALI 106.

Based on the configuration table 220, a request from the second device 212 to access the one or more data variables of the first device may be automatically routed to the interface adapter 102 via the standardized interface 210, and the processors 216 may then access one or more locations associated with the one or more data variables based on the configuration table 220. For example, the processors 216 may access the one or more data variables at the one or more locations of the device memory 226 via the first interface module 202, and provide the one or more data variables to the second device 212 via the second interface module 208. Based on the request from the second device 212 via the standardized interface 210 and the second interface module 208, the processors 216 may read the one or more data variables at the one or more locations of the device memory 226 via the first interface module 202 and/or write data to the one or more locations of the device memory 226 via the first interface module 202. The first interface module 202 is compatible with at least one of a wired line communication interface, such as the RS232 interface, an RS485 interface, or the like, or a wireless communication interface, such as a WiFi interface, a Zigbee interface, a Bluetooth interface, a near-field communication (NFC) interface, or the like. The second interface module 208 is compatible with at least a digital addressable lighting interface (DALI).

The first interface module 202 may comprise a first interface 230 for coupling with the native interface 204 wirelessly or via a wire, and a first logic circuit 232 for managing data between the processors 216 and the first device 206. The first interface module 202 may further comprise a first transceiver 234 if the first interface 230 is a wireless unit. The second interface module 208 may comprise a second interface 236 for coupling with the standardized interface 210 wirelessly or via a wire, and a second logic circuit 238 for managing data between the processors 216 and the second device 212. The second interface module 208 may further comprise a second transceiver 240 if the second interface 236 is a wireless unit.

Figure 3:
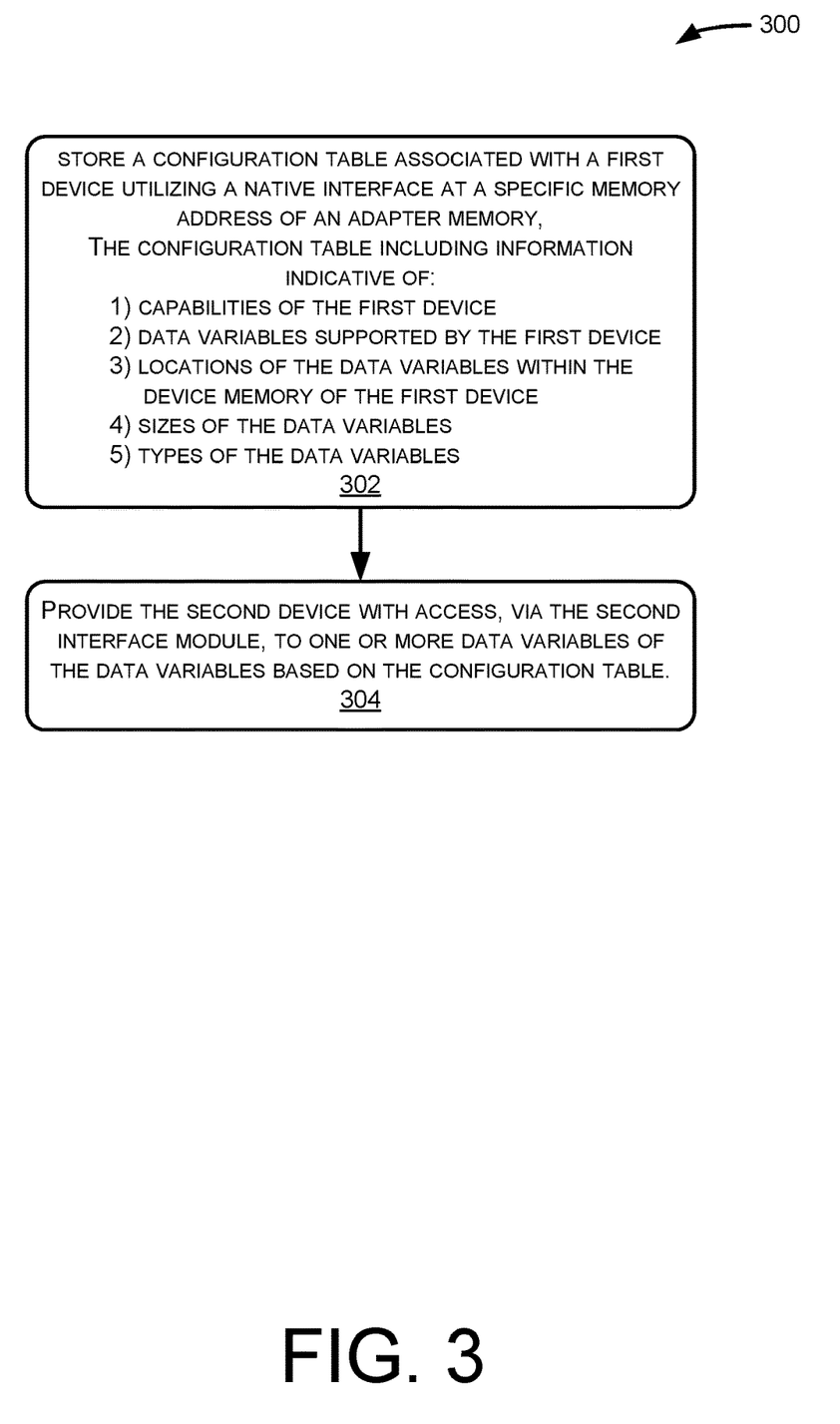
FIG. 3 illustrates an example process of the interface adapter managing communication between a first device and a second device.

FIG. 3 illustrates an example process 300 of the interface adapter 102 managing communication between the first device 206 and the second device 212. The example process 300 is illustrated as a logical flow graph, with reference to FIG. 2, operation of which represents a sequence of operations that can be implemented in hardware, software, or a combination thereof.

At block 302, the processors 216 may store the configuration table 220 associated with the first device 206 utilizing the native interface 204 of the first device 206 at the specific memory location, or address 218, of the adapter memory 214. The configuration table 220 may include the information 222 indicative of: capabilities of the first device 206, data variables 224 supported by the first device 206, locations of the data variables 224 within the device memory 226 of the first device 206, sizes of the data variables 224, and types of the data variables 224. At block 304, the processors 216 of the interface adapter 102 provide the second device with access, via the second interface module 208, to one or more data variables of the data variables based on the configuration table 220. In other words, by utilizing the configuration table 220, the processors 216 of the interface adapter 102 enable a standardized way for the second device 212, such as the NLC 108, to access the data from the first device 206, such as the RS232 sensor 104, over the standardized interface 210, such as the DALI 106.

Figure 4:
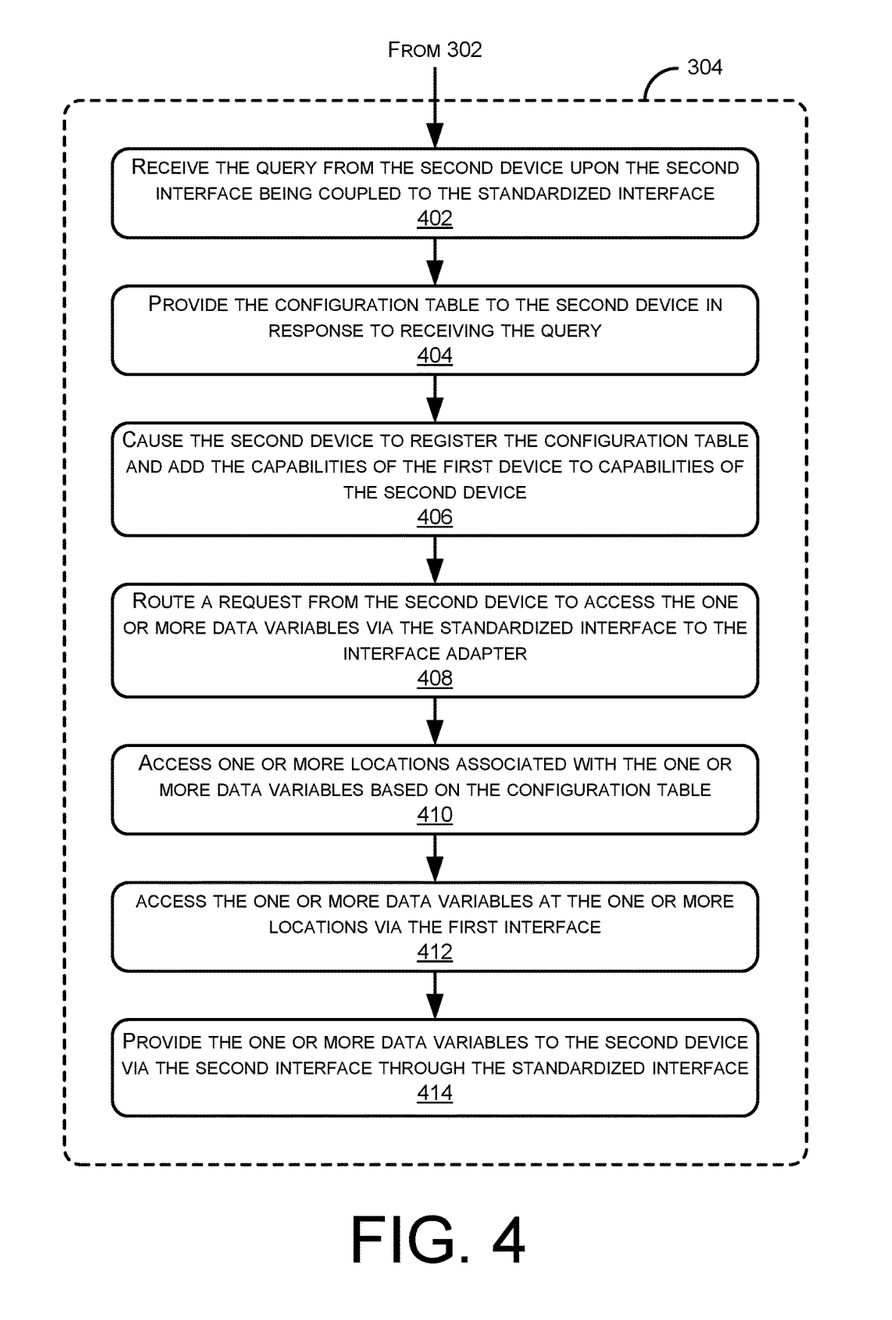
FIG. 4 illustrates a flowchart further describing examples of one of the blocks of FIG. 3.

FIG. 4 illustrates a flowchart further describing examples of block 304 of FIG. 3. At block 402, the processors 216 may receive the query 228 from the second device 212 upon (e.g., responsive to, or based at least in part on) the second interface module 208 being coupled to the standardized interface 210, and may provide the configuration table 220 to the second device 212 in response to receiving the query 228 at block 404. At block 406, the processors 216 may cause the second device 212 to register the configuration table 220 and to add the capabilities of the first device 206 to capabilities of the second device 212.

As described above with reference to FIG. 2, the NLC 108 utilizing the DALI 106, as the second device 212, may normally include lighting related capabilities, such as turning on and off or dimming an LED array 112 with an LED driver 110 as shown in FIG. 1, reading asset data, such as asset data of the LED driver 110 and the LED array 112, reading fault conditions of the LED driver 110 and the LED array 112, reading electrical metrology data associated with the NLC 108 in some cases, and supporting lighting-related sensors as push-buttons, occupancy sensors, and light sensors. By registering the configuration table 220, the NLC 108 may recognize the configuration table 220 as a DALI compatible device, and may add the capabilities of the first device 206, such as the RS232 sensor 104, to the capabilities of the NLC 108. The RS232 sensor 104 may include a smart city sensor capable of monitoring and reporting traffic, pollution, weather, and/or other parameters. Additionally, in response to receiving the query 228 from the second device 212, i.e., the NLC 108, for each data variable, or configuration available within the first device, i.e., the RS232 sensor 104, the interface adapter 102 may make the following information available to the NLC 108: 1) a variable identifier, such as a lightweight machine to machine (LwM2M) resource link, an identifier as per ANSI C137.10, and/or proprietary reference number; 2) location of the data within a DALI device memory or the RS232 sensor 104; 3) a length of the data (in bytes); and 4) data type, for example, whether signed or unsigned integer, or string or byte list, and whether data is writeable. LwM2M is a protocol from the Open Mobile Alliance (OMA), and standard LwM2M Object 3428 may be used to represent data available in an air quality sensor, which is an example of the first device 206, for example, a resource link "3428/0/15" may represent a level of nitrogen dioxide measured by the air quality sensor. By utilizing the configuration table 220, the interface adapter 102 enables a standardized way to access the data from the first device 206, such as the RS232 sensor 104, over the standardized interface 210, such as the DALI 106.

At block 408, based on the configuration table 220, a request from the second device 212 to access the one or more data variables 224 may be automatically routed via the standardized interface 210 to the interface adapter 102. The processors 216 may access one or more locations associated with the one or more data variables 224 based on the configuration table 220 at block 410, access the one or more data variables 224 at the one or more locations of the device memory 226 via the first interface module 202 at block 412, and provide the one or more data variables 224 to the second device 212 via the second interface module 208 through the standardized interface 210 at block 414. For example, the processors 216 may read the one or more data variables 224 at the one or more locations of the device memory 226 via the first interface module 202 and/or write data to the one or more locations of the device memory 226 via the first interface module 202. The first interface module 202 is compatible with at least one of a wired line communication interface, such as the RS232 interface, the RS485 interface, and the like, or a wireless communication interface, such as the WiFi interface, the Zigbee interface, the Bluetooth interface, the near-field communication (NFC) interface, and the like. The second interface module 208 is compatible with at least a digital addressable lighting interface (DALI).

Some or all operations of the methods described above can be performed by execution of computer-readable instructions stored on a computer-readable storage medium, as defined below. The terms "computer-readable medium," "computer-readable instructions," and "computer executable instructions" as used in the description and claims, include routines, applications, application modules, program modules, programs, components, data structures, algorithms, and the like. Computer-readable and -executable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transitory computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

A. An interface adapter includes a first interface module configured to couple to a native interface of a first device, a second interface module configured to couple to a standardized interface of a second device, an adapter memory, and one or more processors coupled to the first interface module, the second interface module, and the adapter memory, where the standardized interface is different from the native interface. The one or more processors are configured to store a configuration table associated with the first device at a specific memory location of the adapter memory. The configuration table is indicative of capabilities of the first device, data variables supported by the first device, locations of the data variables within a device memory of the first device, sizes of the data variables, and types of the data variables. The one or more processors are configured to provide the second device with access, via the second interface module, to one or more data variables of the data variables based on the configuration table.

B. The interface adapter of example A, wherein the one or more processors are further configured to provide the configuration table to the second device in response to receiving a query from the second device upon the second interface module being coupled to the standardized interface.

C. The interface adapter of example B, wherein the one or more processors are further configured to cause the second device to register the configuration table, and cause the second device to add the capabilities of the first device to capabilities of the second device.

D. The interface adapter of example A, wherein, based on the configuration table, a request from the second device to access the one or more data variables is routed via the standardized interface to the interface adapter, and the one or more processors are further configured to access one or more locations associated with the one or more data variables based on the configuration table.

E. The interface adapter of example D, wherein the one or more processors are further configured to access the one or more data variables at the one or more locations via the first interface module, and provide the one or more data variables to the second device via the second interface module.

F. The interface adapter of example E, wherein the one or more processors are further configured to read the one or more data variables at the one or more locations via the first interface module based on the request.

G. The interface adapter of example E, wherein the one or more processors are further configured to write data to the one or more locations via the first interface module based on the request.

H. The interface adapter of example A, wherein the first interface module is compatible with at least one of a wired line communication interface, or a wireless communication interface.

I. The interface adapter of example A, wherein the second interface module is compatible with a digital addressable lighting interface (DALI).

J. A method includes storing a configuration table associated with a first device utilizing a native interface at a specific memory location of an adapter memory of an interface adapter where the first device is coupled to a first interface module of the interface adapter. The configuration table is indicative of capabilities of the first device, data variables supported by the first device, locations of the data variables within a device memory of the first device, sizes of the data variables, and types of the data variables. The method additionally includes providing a second device with access, by utilizing a standardized interface, to one or more data variables of the data variables based on the configuration table via a second interface module of the interface adapter, where the standardized interface is different from the native interface.

K. The method of example J further includes, in response to receiving a query from the second device upon a second interface module of the interface adapter being coupled to the standardized interface, providing the configuration table to the second device, causing the second device to register the configuration table, and causing the second device to add the capabilities of the first device to capabilities of the second device.

L. The method of example J further includes, based on the configuration table, routing, via the standardized interface to the interface adapter, a request to access the one or more data variables from the second device, and accessing one or more locations associated with the one or more data variables based on the configuration table.

M. The method of example L further includes accessing the one or more data variables at the one or more locations via the first interface module, and providing the one or more data variables to the second device via the second interface module.

N. The method of example M, wherein accessing the one or more data variables includes at least one of reading the one or more data variables at the one or more locations via the first interface module based on the request, or writing data to the one or more locations via the first interface module based on the request.

O. The method of claim J, wherein the first interface module is compatible with at least one of a wired line communication interface, or a wireless communication interface, and the second interface module is compatible with a digital addressable lighting interface (DALI).

P. A non-transitory computer-readable storage medium stores thereon computer executable instructions that, when executed by one or more processors, cause the one or more processors to perform operations. The operations include storing a configuration table associated with a first device utilizing a native interface at a specific memory location of an adapter memory of an interface adapter where the first device is coupled to a first interface module of the interface adapter. The configuration table is indicative of capabilities of the first device, data variables supported by the first device, locations of the data variables within a device memory of the first device, sizes of the data variables, and types of the data variables. The operations additionally include, by utilizing a standardized interface, providing a second device with access to one or more data variables of the data variables based on the configuration table, where the standardized interface is different from the native interface.

Q. The non-transitory computer-readable storage medium of example P, wherein the operations additionally include, in response to receiving a query from the second device upon a second interface module of the interface adapter being coupled to the standardized interface, providing the configuration table to the second device, causing the second device to register the configuration table, and causing the second device to add the capabilities of the first device to capabilities of the second device.

R. The non-transitory computer-readable storage medium of example P, wherein the operations additionally include routing, based on the configuration table, a request from the second device to access the one or more data variables via the standardized interface to the interface adapter, and accessing one or more locations associated with the one or more data variables based on the configuration table.

S. The non-transitory computer-readable storage medium of example R, wherein accessing the one or more locations associated with the one or more data variables based on the configuration table includes at least one of reading the one or more data variables at the one or more locations via the first interface module based on the request, or writing data to the one or more locations via the first interface module based on the request.

T. The non-transitory computer-readable storage medium of example Q, wherein the first interface module is compatible with at least one of a wired line communication interface or a wireless communication interface, and the second interface module is compatible with a digital addressable lighting interface (DALI).

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An interface adapter comprising:
    a first interface module configured to couple to a native interface of a first device;
    a second interface module configured to couple to a standardized interface of a second device, the standardized interface different from the native interface;
    an adapter memory; and
    one or more processors coupled to the first interface module, the second interface module, and the adapter memory, the one or more processors configured to:
        store, at a specific memory location of the adapter memory, a configuration table associated with the first device, the configuration table indicative of:
            capabilities of the first device,
            data variables supported by the first device,
            locations of the data variables within a device memory of the first device,
            sizes of the data variables, and
            types of the data variables, and
        provide the second device with access, via the second interface module, to one or more data variables of the data variables based on the configuration table.

2. The interface adapter of claim 1, wherein the one or more processors are further configured to:
    in response to receiving a query from the second device upon the second interface module being coupled to the standardized interface, provide the configuration table to the second device.

3. The interface adapter of claim 2, wherein the one or more processors are further configured to:
    cause the second device to register the configuration table, and cause the second device to add the capabilities of the first device to capabilities of the second device.

4. The interface adapter of claim 1, wherein:
based on the configuration table, a request from the second device to access the one or more data variables is routed via the standardized interface to the interface adapter, and
the one or more processors are further configured to access one or more locations associated with the one or more data variables based on the configuration table.

5. The interface adapter of claim 4, wherein the one or more processors are further configured to:
access the one or more data variables at the one or more locations via the first interface module; and
provide the one or more data variables to the second device via the second interface module.

6. The interface adapter of claim 5, wherein the one or more processors are further configured to:
read the one or more data variables at the one or more locations via the first interface module based on the request.

7. The interface adapter of claim 5, wherein the one or more processors are further configured to:
write data to the one or more locations via the first interface module based on the request.

8. The interface adapter of claim 1, wherein the first interface module is compatible with at least one of:
a wired line communication interface, or
a wireless communication interface.

9. The interface adapter of claim 1, wherein the second interface module is compatible with a digital addressable lighting interface (DALI).

10. A method comprising:
storing, at a specific memory location of an adapter memory of an interface adapter, a configuration table associated with a first device utilizing a native interface, the first device coupled to a first interface module of the interface adapter, the configuration table indicative of:
capabilities of the first device,
data variables supported by the first device,
locations of the data variables within a device memory of the first device,
sizes of the data variables, and
types of the data variables, and
providing a second device with access, by utilizing a standardized interface, to one or more data variables of the data variables based on the configuration table via a second interface module of the interface adapter, the standardized interface different from the native interface.

11. The method of claim 10, further comprising:
in response to receiving a query from the second device upon a second interface module of the interface adapter being coupled to the standardized interface, providing the configuration table to the second device;
causing the second device to register the configuration table; and
causing the second device to add the capabilities of the first device to capabilities of the second device.

12. The method of claim 10, further comprising:
based on the configuration table, routing a request, to access the one or more data variables from the second device, via the standardized interface to the interface adapter; and
accessing one or more locations associated with the one or more data variables based on the configuration table.

13. The method of claim 12, further comprising:
accessing the one or more data variables at the one or more locations via the first interface module; and
providing the one or more data variables to the second device via the second interface module.

14. The method of claim 13, wherein accessing the one or more data variables includes at least one of:
reading the one or more data variables at the one or more locations via the first interface module based on the request, or
writing data to the one or more locations via the first interface module based on the request.

15. The method of claim 10, wherein:
the first interface module is compatible with at least one of:
a wired line communication interface, or
a wireless communication interface, and
the second interface module is compatible with a digital addressable lighting interface (DALI).

16. A non-transitory computer-readable storage medium storing thereon computer executable instructions that, when executed by one or more processors, cause the one or more processors to perform operations, the operations comprising:
storing, at a specific memory location of an adapter memory of an interface adapter, a configuration table associated with a first device utilizing a native interface, the first device coupled to a first interface module of the interface adapter, the configuration table indicative of:
capabilities of the first device,
data variables supported by the first device,
locations of the data variables within a device memory of the first device,
sizes of the data variables, and
types of the data variables, and
providing a second device with access, by utilizing a standardized interface, to one or more data variables of the data variables based on the configuration table, the standardized interface different from the native interface.

17. The non-transitory computer-readable storage medium of claim 16, wherein the operations further comprise:
in response to receiving a query from the second device upon a second interface module of the interface adapter being coupled to the standardized interface, providing the configuration table to the second device;
causing the second device to register the configuration table; and
causing the second device to add the capabilities of the first device to capabilities of the second device.

18. The non-transitory computer-readable storage medium of claim 17, wherein:
the first interface module is compatible with at least one of:
a wired line communication interface, or
a wireless communication interface, and
the second interface module is compatible with a digital addressable lighting interface (DALI).

19. The non-transitory computer-readable storage medium of claim 16, wherein the operations further comprise:
routing a request, from the second device to access the one or more data variables, based on the configuration table via the standardized interface to the interface adapter; and accessing one or more locations associated with the one or more data variables based on the configuration table.

20. The non-transitory computer-readable storage medium of claim 19, wherein accessing the one or more locations associated with the one or more data variables based on the configuration table includes at least one of:
reading the one or more data variables at the one or more locations via the first interface module based on the request, or
writing data to the one or more locations via the first interface module based on the request.

* * * * *